Figure 11:
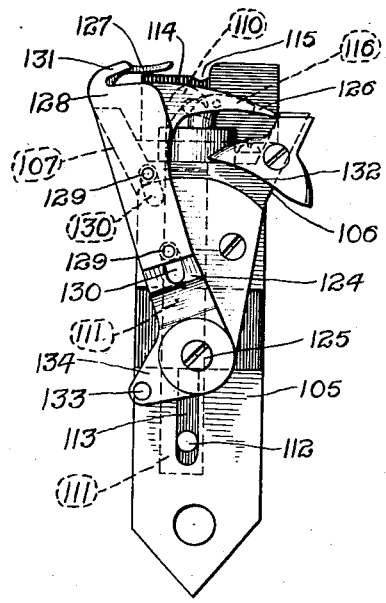

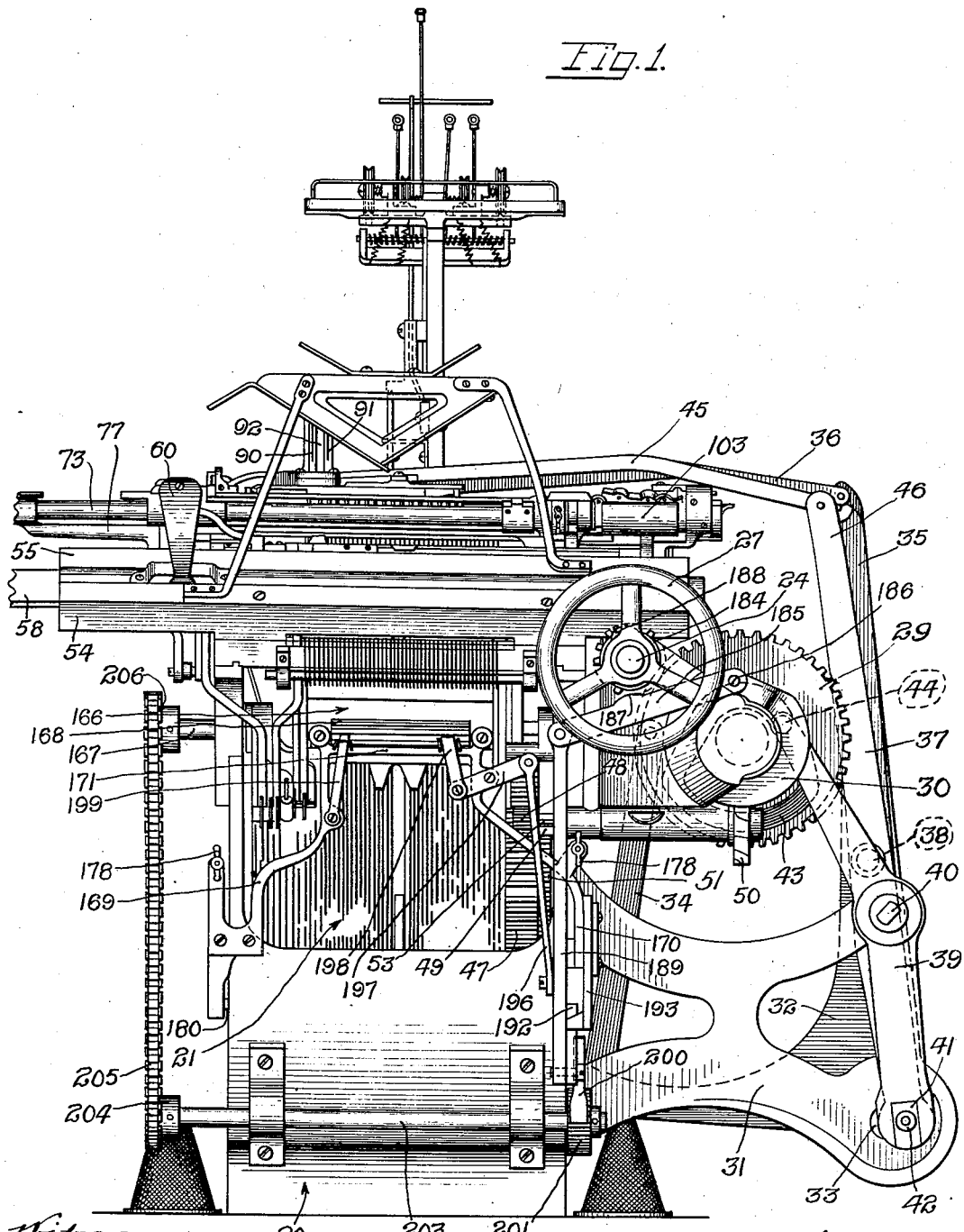

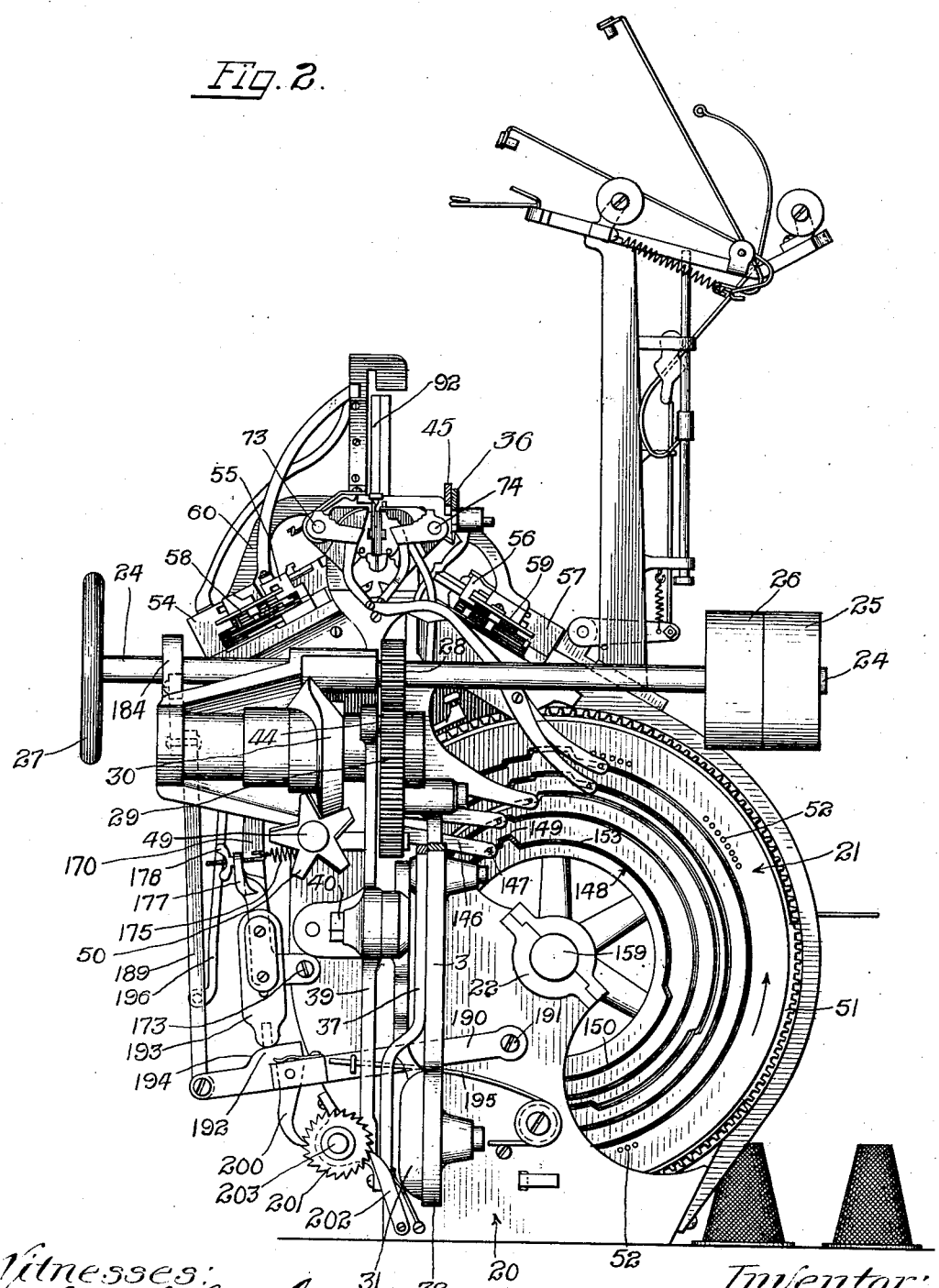

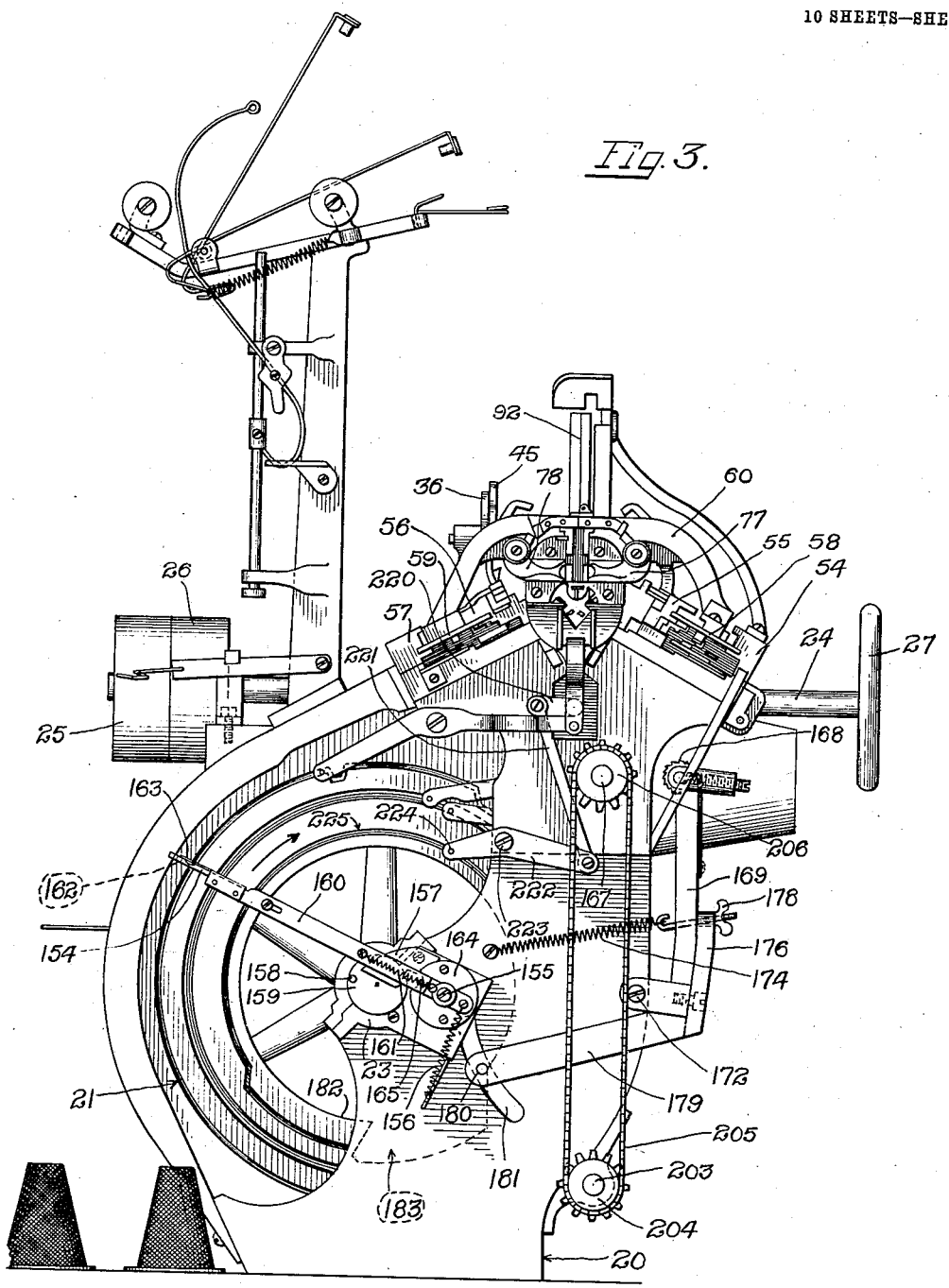

J. F. NELSON.
KNITTING MACHINE.
APPLICATION FILED DEC. 2, 1912.
1,087,545.
Patented Feb. 17, 1914.
10 SHEETS—SHEET 4.
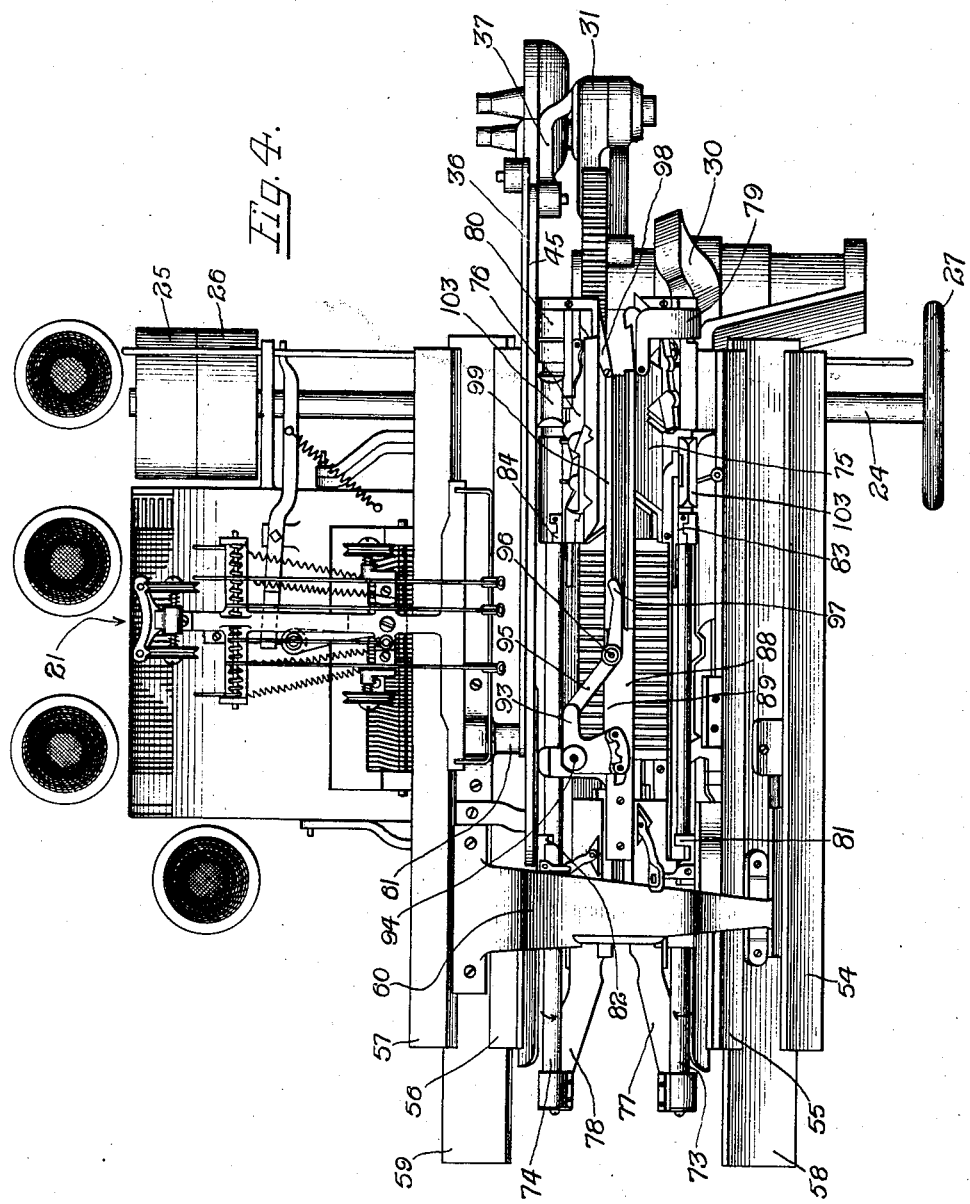

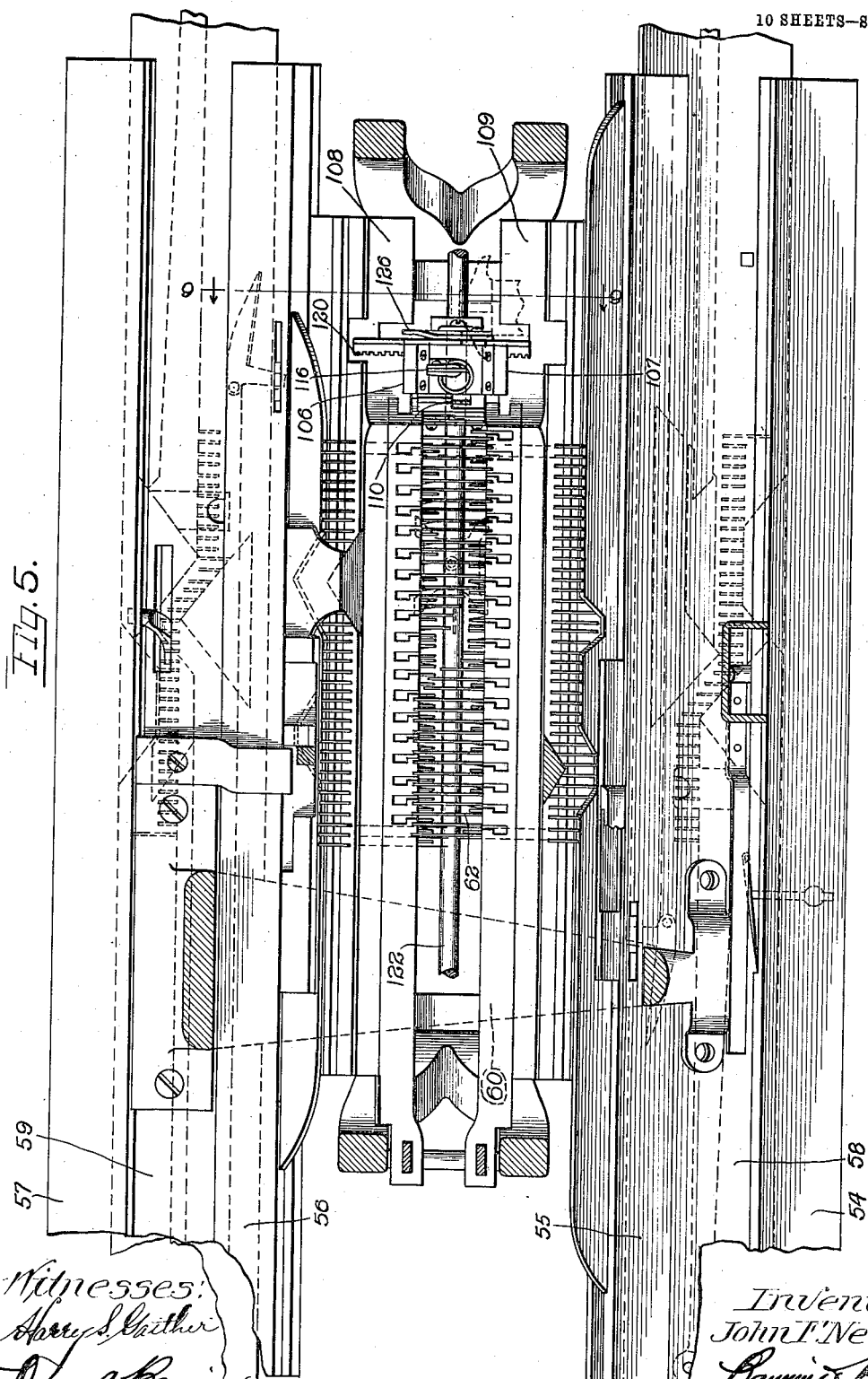

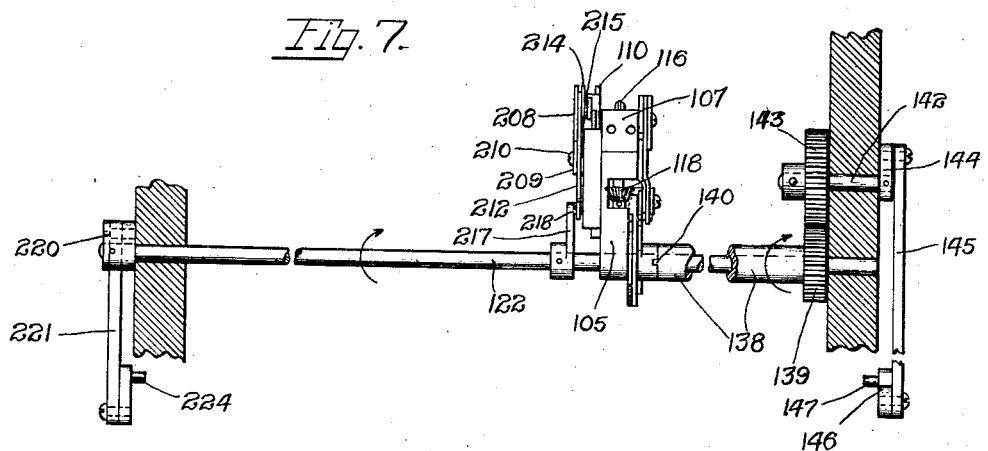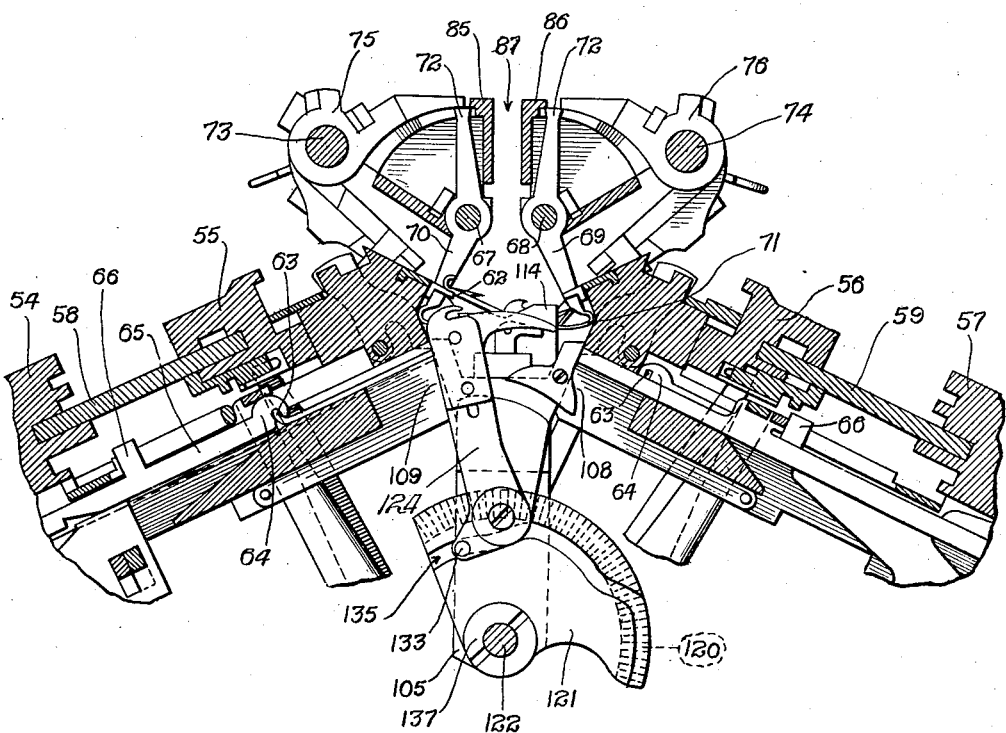

J. F. NELSON.
KNITTING MACHINE.
APPLICATION FILED DEC. 2, 1912.
1,087,545.
Patented Feb. 17, 1914.
10 SHEETS—SHEET 7.
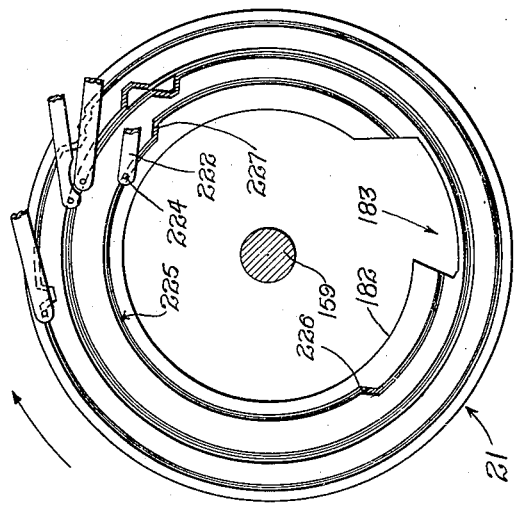
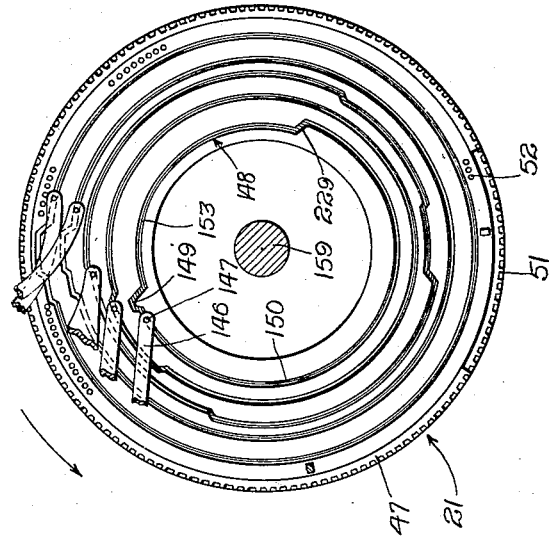

J. F. NELSON.
KNITTING MACHINE.
APPLICATION FILED DEC. 2, 1912.

1,087,545.

Patented Feb. 17, 1914.
10 SHEETS—SHEET 8.

Witnesses:
Harry S. Gaither
Thomas A. Banning Jr.

Inventor:
John F. Nelson
by Banning & Banning
Attys

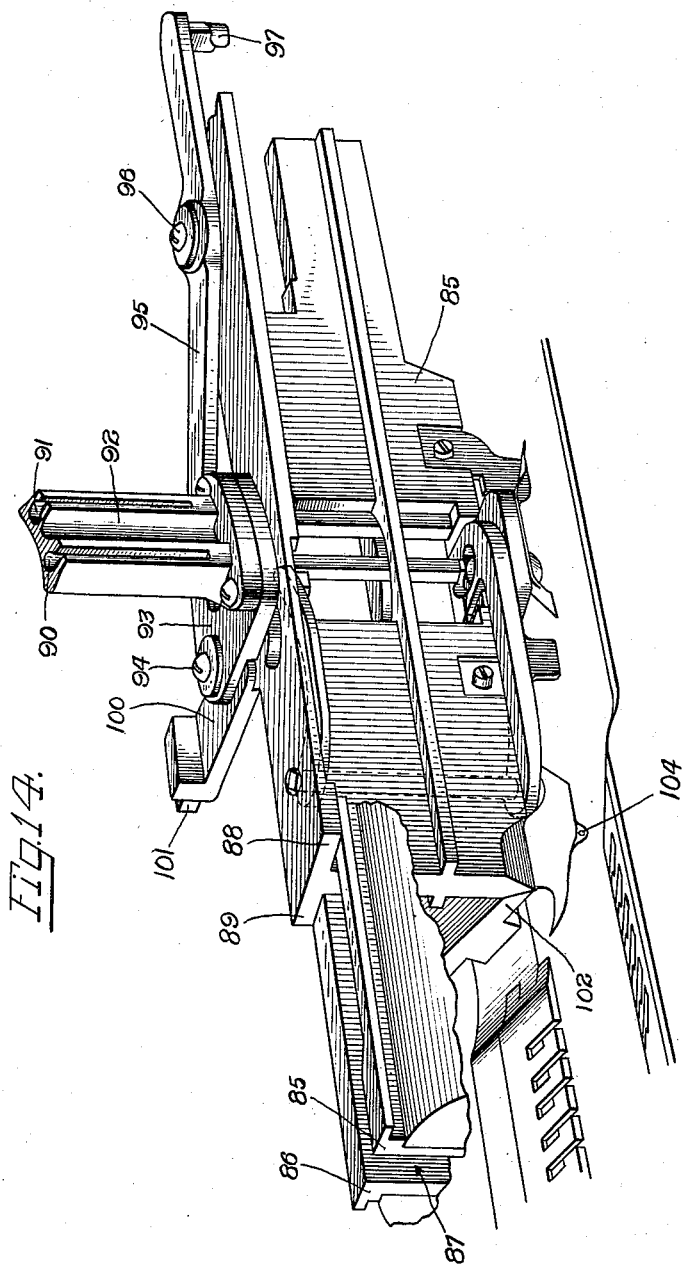

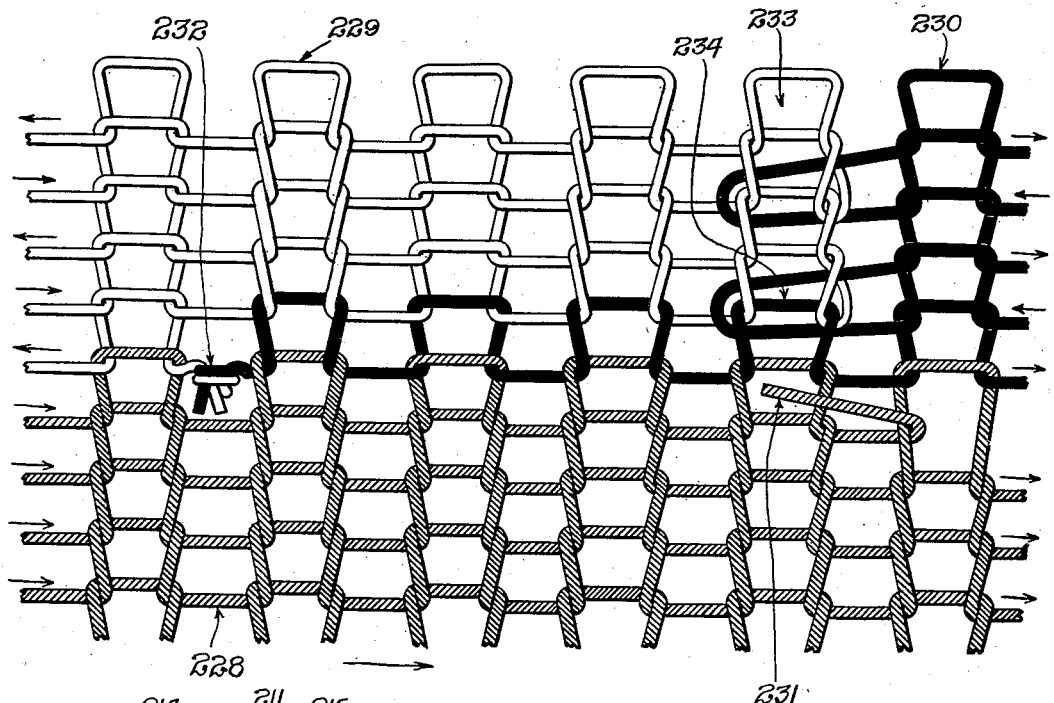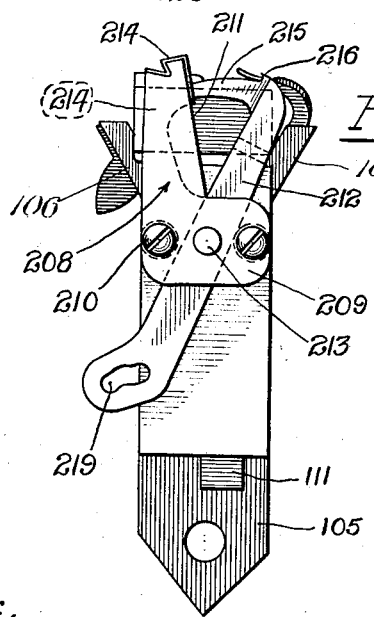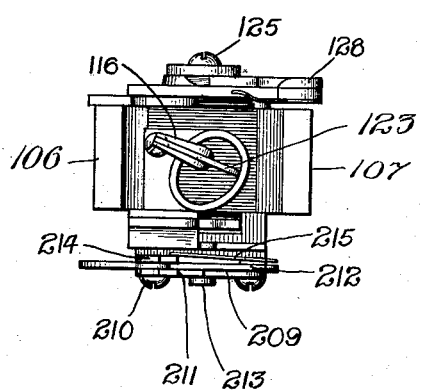

UNITED STATES PATENT OFFICE.

JOHN F. NELSON, OF ROCKFORD, ILLINOIS, ASSIGNOR TO FOREST CITY KNITTING CO., OF ROCKFORD, ILLINOIS, A CORPORATION OF ILLINOIS.

KNITTING-MACHINE.

1,087,545.  Specification of Letters Patent.  Patented Feb. 17, 1914.

Application filed December 2, 1912. Serial No. 734,533.

*To all whom it may concern:*

Be it known that I, JOHN F. NELSON, a citizen of the United States, residing at Rockford, in the county of Winnebago and State of Illinois, have invented certain new and useful Improvements in Knitting-Machines, of which the following is a specification.

This invention relates to certain improvements in knitting machines of that general type which are adapted to the formation of ribbed top socks and stockings or like articles of apparel in which the ribbed portion is knit from two yarns. As a general rule, in knitting socks or stockings of this character, a single yarn is used for the body or leg portion which yarn is dropped when the time arrives for commencing the ribbing operation. Nevertheless, the last course of loops of the body or leg portion is interlooped with the first course of the ribbed top, so that the knitting proceeds continuously and when the sock or stocking is completed all of its portions are so knit together and constitute virtually a single piece of knitting.

For purposes of convenience in discussion, I shall speak of the article of apparel produced on a machine of the present invention as the sock, although it will be understood that wherever this term is used I contemplate also stockings or any other articles in which a portion is knit from two yarns which are picked up and carried forward together during a knitting operation.

In machines of the character to which this invention relates, that is, in which the ribbed top is formed from two yarns, the free ends of these yarns at the point of beginning the ribbing operation are left disconnected and generally lie to the outside of the completed sock. It is a general rule also that, as the knitting of the ribbed portion proceeds, each of the ribbing yarns is carried back and forth to form the successive courses, the two yarns being interlooped or otherwise joined each time they come together. Therefore, it generally happens that when the ribbing operation is completed there exist two lines of interlooping, one on each side of the sock, which lines, however, do not differ materially in appearance from any of the other ribs. The aforementioned free ends of the ribbing yarns extend out from the sock at the point where one of these lines of interlooping meets the last course of the body or leg portion, and it is now customary to take the sock after the machine operations are completed and by means of a hook or other suitable device to draw these free ends to its interior. They are then allowed to hang freely in the interior, being cut off if desired to such length as not to be objectionable.

A sock completed in the above manner presents the objection that it is weak at the point where the ribbing operation commences, there being a tendency for it to pull open at such point, and it is not desirable to have the free ends lying disconnected on the interior of the sock. Furthermore, as above pointed out, it has been necessary to draw the free ends to the interior by a hand operation, so that the cost of manufacture is materially increased.

The main object of the present invention is to combine a knot-tying device with a knitting machine which knits the ribbed portion from two separate yarns, so that said yarns will be tied together before the ribbing operation commences. In this way the completed product will not have to be subjected to an additional operation for drawing the ends of the ribbing yarns to its interior, and the sock will be of improved quality and strength for the reason that it cannot draw or pull apart at the point where the ribbing operation commences. The product of such a machine is similar to that which would be produced in case a ribbing yarn were to be fed into one of the ribbing yarn carriers, through the machine, and then out from the other carrier so as to have sufficient length of such yarn extending from each side of the machine to carry on the ribbing operation for a complete sock. Another way of looking at the matter would be that the product produced on such a machine has both of the ribbing yarns tied together at the point where the ribbing operation commences so that they virtually constitute a single yarn having its two ends at the upper edge of the sock where the ribbing operation ceases. Therefore the product of such a machine can generally be distinguished by the presence of a knot joining together the two ribbing yarns at or near the point where the ribbing operation commences. Or the product might be distinguished by grasping the free ends of both of the ribbing yarns and then completely unraveling the ribbed portion, in which case it would be found, when said yarns were thus completely unraveled, that they were joined together. Therefore, it is a comparatively easy matter to detect socks or other articles manufactured on a machine provided with a knotter according to the present invention.

It was previously stated that in machines of that type in which the ribbed portion is made from two yarns the ribbing operation commences approximately at the point where the knitting of the body portion ceases, and that the ribbing yarns are then carried back and forth to form the successive courses, as a rule being interlooped or knit together on those lines where the two yarns meet each other in their back and forth travels. It was also stated that as a general rule in such machines the beginning ends of the ribbing yarns project from the sock at the point where one of these lines of interlooping meets the last course in the formation of the body portion. When the ribbing yarns are joined together exactly at the point where this line of interlooping meets the last course of the body portion, it is found that the knot produces an unusual enlargement or thickness, and is undesirably conspicuous. For these reasons, it is desirable to locate the knot to one side or the other from the aforementioned line of interlooping.

Another feature of this invention consists in the provision of mechanism whereby when the knitting of the ribbed portion commences, the knot will be located to one side or the other of the line of interlooping. As a general rule this result is accomplished by a mechanism which will offset the knot to one side or the other after it has been tied, but it is evident that the desired result might be attained by initially forming the knot off center.

Other objects and uses will appear from a detailed description of the invention which consists in the features of construction and combination of parts hereinafter described and claimed.

Figure 10:
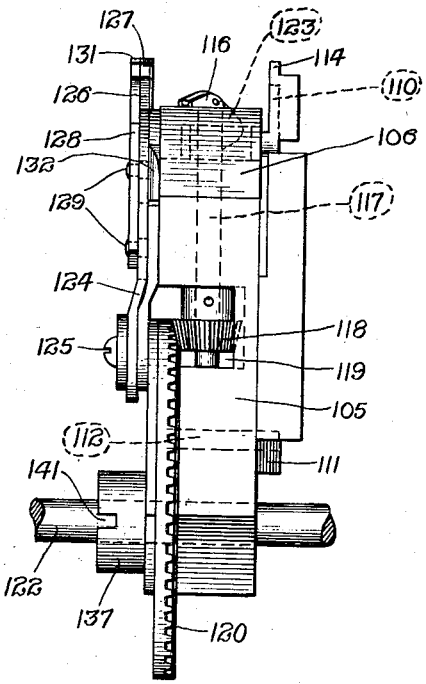
Figure 12:
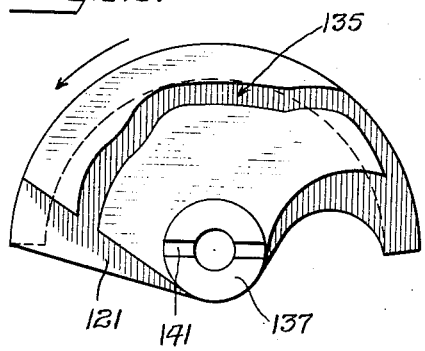
Figure 13:
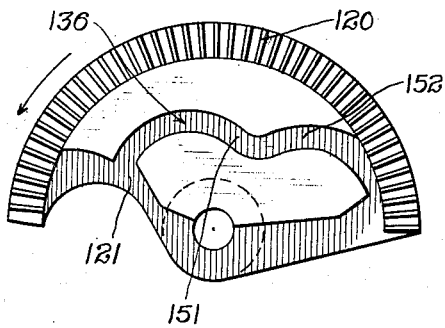

Referring to the drawings, Figure 1 shows a front view of a completed machine having the several yarns fed into the yarn carriers and showing one of the tripping arms in released position; Fig. 2 is an elevation of the right hand end of the machine; Fig. 3 is an elevation of the left-hand end of the machine; Fig. 4 is a plan view of the machine; Fig. 5 is a detail of the interior of the machine showing the body needles and the knotter and associated mechanisms mounted in position alongside of the needles; Fig. 6 is an enlarged section taken on the line 6—6 of Fig. 5 looking in the direction of the arrows; Fig. 7 is a detail skeleton elevation of the knotter and the operating mechanisms for actuating it; Fig. 8 is a detail view of the right-hand end of the drum; Fig. 9 is a detail view of the left-hand end of the drum; Fig. 10 shows an enlarged view of the back of the knotter, showing the knife for the body yarn mounted in position; Fig. 11 shows an enlarged view of the right-hand side of the knotter with the segmental rack and cams removed; Fig. 12 is a view of the right-hand face of the segmental rack plate showing the cam which operates the knot tightener and stripper; Fig. 13 is a view of the left-hand face of the segmental rack plate showing the cam which operates the yarn lowering hook; Fig. 14 shows the main yarn carrier, and associated parts in perspective; Fig. 15 is a detail view of the left-hand side of the knotter showing the knife for severing the body yarn mounted in position; Fig. 16 is an enlarged plan view of the knotter and the knife which severs the body yarn; and Fig. 17 is an enlarged detail of a portion of the sock showing the line of interlooping of the ribbing yarns and the adjacent portions of the body and the ribbed top; showing also the free end of the body yarn and the knot which ties together the two ribbing yarns. In the product illustrated in this figure the knot is located at a point to one side of the line of interlooping.

As previously stated, the present invention relates particularly to certain improvements in that type of machine in which two separate yarns are used in knitting the ribbed portion of the sock. For purposes of convenience in illustrating and describing the present improvements, I have shown them as embodied in a machine of the general type illustrated in Patent No. 617,039, issued to me January 3rd, 1899, but it will be understood that the improvements are in no wise limited to use in connection with such construction, as it will soon be seen that certain of them can be used in connection with other forms of knitting machines.

I will first describe briefly the knitting machine to which I have shown my improvements as applied, so as to facilitate description of said improvements and understanding of their operation, and particularly as applied in the present case. By thus describing and illustrating my improvements as applied to the particular machine shown, however, I in no wise limit their use to such machine, except as may be especially done in the claims, but I contemplate their use in conjunction with any form of knitting machine in which a portion of the product is formed from two yarns to produce substantially the product of the present case.

Referring to the several figures, a base portion 20 is provided, a controlling drum 21 being journaled on the base at the points 22 and 23, and in operation rotates in the direction of the arrows. A main shaft 24 extends transversely of the frame, carrying a drive pinion 25 and a loose pinion 26, and a hand wheel 27 may be used to rotate the shaft for preliminary adjustments.

A pinion 28 on the main shaft drives a main gear 29, which in turn drives a feed-worm 30, as well as serving to swing the levers which drive the slides back and forth.

A bracket 31 has a bell crank 32 pivoted to its lower corner 33, which bell crank is rocked by means of a link 34 connected to the main gear. The upper end 35 of the said bell crank serves, through the medium of a link 36, to drive the slides back and forth for actuating the needles.

A lever arm 37 is pivoted to the upstanding arm of the bell crank at the point 38, so that the center about which such lever oscillates is dependent upon the instantaneous position of the bell crank. Another lever 39 is pivoted to the outstanding bracket at the point 40. Its lower end 41 is slotted to receive a roller 42 or the like on the lower end of the lever 37, so that by oscillating the lever 39 the lever 37 will be oscillated about its pivotal point 38. The forward face of the main gear carries a cam groove 43, in which rides a roller 44 on the upper end of the lever 39, so that such lever is oscillated back and forth as the main gear rotates. A link 45 establishes connection between the upper end 46 of the lever 37 and the yarn carrier for the body portion of the sock or other article of apparel.

A study of the mechanisms thus far described will show that as the links 36 and 45 are drawn back and forth the link 36 which drives the yarn carrier will always take the lead, whether it be traveling to the right or left. The right end of the controlling drum carries a mutilated gear 47, which at times is driven by a pinion 48 of a stub shaft 49. The latter in turn carries a worm gear 50, which meshes with the worm 30, so that the gear 47 of the drum is advanced one tooth for each revolution of the main gear until a mutilation is encountered in the gear 47. A number of segmental gears 51 are slidably mounted on the drum, the amount of their free movement being determined by means of pins set into groups of holes 52 in the drum, so that the amount of free movement of each segmental gear is dependent upon the positions of such pins. A tooth 53 carried by the stub shaft 49, engages one of the teeth of a segmental rack during each rotation of the shaft 49, so that as soon as the pinion 48 strikes a mutilation of the gear 47, the tooth 53 will commence to advance the adjacent segmental rack, which is at that time in operative position, and will continue to advance the same without rotating the drum until such segmental rack has its free movement exhausted by striking a pin on the drum. As soon as this takes place, the drum will be advanced and the gear 47 will again mesh with the pinion 48, which meshing will continue until another mutilation is encountered. This drum is for the purpose of controlling the "set-up" of the needles and for actuating various other devices which are to be operated from time to time as the knitting progresses. Of course, as long as the set-up remains unchanged, as, for example, during the knitting of the body of the sock, it is unnecessary to change the position of the drum, as the knitting operation will proceed uniformly during the succeeding strokes of the links 36 and 45 until the set-up is changed or some mechanism is actuated by the rotation of the drum. It is for this reason that the periods of rest are provided by mutilating the gear 47. I will shortly show how I make use of the presence of this rotating drum for the purpose of controlling the movements of certain attachments to which this invention particularly relates, although at such time it will be understood that any other suitable mechanism might be substituted for actuating such attachments.

In the upper portion of the frame there are provided transverse forward guide bars 54 and 55, and transverse rear guide bars 56 and 57. A forward slide 58 works between the guide bars 54 and 55 and a rear slide 59 between the guide bars 56 and 57. A bridge plate 60 connects these two slides together, so that they are forced to travel back and forth in unison. The link 36 has its left hand end directly connected to a block 61 on the rear slide, so that the latter is forced to travel back and forth strictly in accordance with the movements of the link 36, the forward slide also being forced to travel in the same way by reason of the bridge connection 60.

Referring particularly to Figs. 5 and 6, the needles which are used in the ordinary knitting operation are designated by the numerals 62. They lie in two sets, a forward set and a back set, each set traveling back and forth from and toward the center line of the machine, in accordance with the movements of their respective slides, and in accordance with the set-up as determined by the drum. The rear end of each needle is provided with an upturned finger 63 which hooks into a hook 64 of a corresponding jack 65. Each jack is provided with a lug 66 which engages cams on the lower face of its corresponding slide. Means are provided for lowering the rear ends of the jacks when desired, so that at such time their lugs will not engage the cams on their respective slides. Therefore, the several needles are driven back and forth from and toward the center line of the machine in accordance with the set-up as determined by the drum.

In the upper portion of the frame, there is supported a pair of rods 67 and 68 on which are pivoted forward and rear sets of swinging arms 69 and 70 which carry ribbing hooks 71 at their lower ends. These ribbing hooks are brought into action only during the ribbing operation and during the interval of transfer from the body of the sock to the ribbed portion. The upper ends of each of the swinging arms are provided with fingers 72 which can be rocked back and forth for the purpose of swinging the arms and actuating the ribbing hooks. For this purpose there are provided forward and rear rods 73 and 74, which are mounted in suitable bearings at the ends of the frame. These rods support cam carriers 75 and 76, so that by driving the latter back and forth with their cams, the fingers 72 will be engaged and rocked back and forth for the purpose of actuating the ribbing needles. In the construction illustrated, the left hand ends of the rods 73 and 74 are supported by arms 77 and 78 respectively, which extend out from the frame, the right hand ends of such rods being supported in bearings 79 and 80.

The bridge 60, which connects together the forward and rear slides 58 and 59, has connected to it fingers 81 and 82. The rods 73 and 74 can be rotated through a certain angle, and when thus rotated they also rotate the fingers 81 and 82. The slides 75 and 76 which actuate the ribbing needles are respectively provided with notched blocks 83 and 84, which will be engaged by the fingers 81 and 82 when the rods 73 and 74 have been sufficiently rotated. The fingers travel back and forth with the bridge, so that when the time arrives for bringing the ribbing needles into operation, the rods 73 and 74 are rotated sufficiently to swing the fingers inward toward each other, so that on the proper stroke they will pick up the slides 75 and 76 which normally stand at the right hand side of the machine, and will drive such slides back and forth to operate the ribbing needles as long as the fingers engage the slides.

The frame of the machine is provided with forward and rear guide bars 85 and 86 as shown particularly in Fig. 14, which bars are spaced apart a sufficient distance to provide a slot 87 between them. A main yarn carrier which feeds the yarn during the knitting operations, except those in forming the ribbed top, travels in this slot. This yarn carrier comprises essentially a vertically extending plate, the upper edge of which is widened to provide flanges 88 and 89, which ride on the forward and rear bars 85 and 86 respectively. This carrier is provided with side tongues which ride in grooves near the lower edges of the bars 85 and 86. The two yarns which are used for knitting the toe and heel, and the foot and body, respectively, are fed down through tubes or slots 90 and 91 of an upstanding member 92, which latter is mounted on one arm of a bell crank 93 pivoted to the carrier at the point 94. The bell crank 93 can be rocked by means of an arm 95 pivoted to the carrier at the point 96, so that the yarn which is being fed from the carrier is determined by the position occupied by such arm 95. A finger 97 on the end of the arm engages a switch 98 (shown particularly in Fig. 1), at the proper instant, so as to cause the said finger to travel along the one side or the other of a stationary tongue 99. The switch 98 is shifted so as to change its position at the proper time, by mechanism suitably actuated from the drum.

As previously stated, the link 45 serves at times to drive the main yarn carrier back and forth. For this purpose an arm 100 is extended to one side of the yarn carrier, the same having an outstanding finger 101 which can be engaged by a notch on the end of the link 45. As long as said link rests on such finger, the driving connection will be maintained, but by raising the end of the link the proper amount, it will be disconnected from such finger. Mechanism is provided for raising the end of the link at the proper time, so as to disconnect the main yarn carrier and allow the same to stand idle at the right hand end of the machine during the process of knitting the ribbed top. Such mechanism is likewise actuated through a suitable connection from the drum.

A ribbing yarn carrier 102 is mounted on each of the rods 73 and 74, for the purpose of feeding the yarn for the ribbed top. Each of these carriers has a sleeve 103, which surrounds its corresponding rod and seats within a notch of the corresponding ribbing slide. This arrangement is best illustrated in Fig. 4, from which it is apparent that as long as the ribbing slides are driven back and forth their respective yarn carriers will be operated. Each of these yarn carriers is provided with a perforation 104, as shown in Fig. 14, through which the yarn is delivered to the ribbing needles as the carrier travels back and forth.

All of the above described mechanisms are known in the art, being shown, for example, in my previously mentioned Patent No. 617,039, of January 3, 1899, and they are illustrated and described in the present case simply for the purpose of giving a more perfect understanding as to the relationship which the mechanisms of the present invention bear to one style of machine to which they may be adapted, and for the purpose of facilitating a comprehension of their construction and relative operation.

In the operation of a machine embodying the mechanisms thus far described, the needles 62 are actuated for knitting all portions of the sock except the ribbed top, the latter being formed by the actuating of the needles 71. It was previously stated that use is made of two separate and independent yarns for knitting the ribbed top, each yarn passing back and forth from side to side of the sock as the successive courses are looped. It follows, therefore, that when the sock is completed and these two yarns are severed so as to separate the completed sock from the yarns, that then these two yarns will remain projecting through the holes 104 of the yarn carriers 102, which carriers will remain at rest until the time arrives for knitting the ribbed top of the next succeeding sock. The ends of these yarns thus left projecting from the holes 104 will constitute the free ends of the ribbed top of the next succeeding sock, such as reference was made to in the first part of this specification, and under the present method of operation, wherein these free ends are not tied together by the machine itself, they remain projecting to the outside of the sock, as previously explained.

One of the features of my invention consists in the provision of a knotter of any suitable form, according to the knitting machine with which it is associated, which knotter will automatically tie these free ends together at some appropriate instant, so that when the next succeeding sock is completed the free ends of its ribbed top will have been joined together. By associating a knotter with a knitting machine in this manner, the two yarns of the ribbed top will be joined together, so that when the time arrives for knitting the ribbed top of the next sock, the two yarns coming in from the two carriers 102 will virtually constitute a single yarn, having its center within the machine, and its ends extending therefrom and wound upon the two spools from which the yarn is drawn. The knotter used in the particular arrangement illustrated in the drawings is shown associated with the knitting machine in Figs. 5, 6, and 7, and in detail in Figs. 10, 11, 12, 13, 15 and 16. It was previously shown how the main yarn carrier travels back and forth in the slot 87, and how the yarn carriers for the ribbed top travel back and forth on the rods 73 and 74. All of these carriers, as they travel back and forth, must of necessity lie close to the needles which happen to be in operation, so as to insure that the yarns will be laid into the hooks of the needles. For this reason it follows that a successful knotting attachment must be set down low in the body of the machine so that it will be safely cleared by the yarn carriers as they pass back and forth over it. Nevertheless, the knotter must be so constructed that when the time arrives for tying together the ribbing yarns, the latter will be grasped or engaged by some portion of the knotter so as to bring them into position to be acted upon and tied together. For the above reason, in the particular arrangement illustrated, I have adopted a knotter which is provided with a hook or the like which can be projected upwardly at the proper instant to grasp both of the ribbing yarns and pull them down into position to be engaged by the knotting mechanism. Nevertheless, it will be understood that in illustrating and describing the particular knotter herein disclosed, I in no wise limit myself to the same, except as called for in the claims, for it is obvious that in some cases the parts might be so arranged as to obviate the necessity of using a hook or equivalent element for accomplishing the above result.

The body of the knotter herein disclosed comprises an upright bar 105 or the like, having the front and rear faces of its upper portion flared out to provide the surfaces 106 and 107 respectively, which are adapted to lie against a pair of stationary bars 108 and 109 of the frame respectively. The knotter is thus supported at a position in close proximity to the right hand end needle, as is well shown in Fig. 5, and in such position that when the yarn carriers have completed a stroke to the right the several yarns will be stretched across the machine and will be supported above the knotter. At such a time a hook 110 may be projected upward momentarily to grasp the two ribbing yarns and then draw them down, at which time said hook will occupy substantially the position shown in Fig. 11. This hook is carried by a bar 111, which is slidably mounted in the left hand side of the knotter, but has a pin 112 which extends through to the right hand side thereof. Said pin travels in a slot 113 and is adapted to have its projecting end engaged by a suitably formed cam, so that at the proper time it will be momentarily raised to cause the hook to grasp the yarns and will afterward be lowered to bring the yarns down into the knotter. In order to prevent the yarns from becoming entangled in the knitting needles when lowered by said hook, I provide an abutment 114 having a notch 115, in which the yarns will lie when thus lowered, and by means of which those portions of the yarns which lie on or in the knitting hooks will be prevented from lowering.

A knotting bill 116 of familiar construction is adapted to rotate in the upper portion of the knotter. For this purpose said bill is carried by a suitable shaft 117, the lower end of which carries a bevel pinion 118 working in a recess 119 of the bar 105. A segmental gear 120 carried by a plate 121 and rotating on a shaft 122 is adapted to engage this bevel pinion for the purpose of rotating the knotting bill in the one direction or the other, as desired. The knotting bill herein employed is of that form which makes use of a pivoted wing 123 which rotates with the bill and engages a stationary cam for the purpose of swinging said wing with respect to the bill as the latter rotates. Such bills are familiar in the art, and it is not deemed necessary to describe the one herein illustrated in further detail.

For the purpose of tightening the knot after it has been formed, and for stripping it from the bill, I have provided a hook device which is adapted to sweep past the bill at the proper instant. The same comprises an arm 124 pivoted at the point 125 and having its upper end widened out to provide a guide finger 126, and suitably formed to provide a hook 127. Said guide finger is formed substantially on the arc of a circle, so as to insure that the yarn will be deposited on it no matter what its instantaneous position may be, to thereby insure that when the hook 127 has swept over far enough to the right in Fig. 13, which would be toward the rear of the machine, it will engage the yarns. For the purpose of gripping the yarns when thus engaged, I have provided a slidable plate 128, the same having pins 129 working in slots 130 of the arm 124, so that said plate can be driven up or down with respect to said arm, but is forced to travel forward or back with it. The plate 128 has its upper end formed to provide a hook 131 which will co-act with the hook 127, so that when said plate is driven down the yarns will be tightly gripped between both of said hooks. For the purpose of driving said plate down at the proper instant, I provide the same with a pin adapted to co-act with a cam plate 132, which is suitably formed to cause the lowering of said plate at the proper instant in the travel of the arm 124 toward the rear of the machine. In the particular construction illustrated, the pin which accomplishes this result is one of the guide pins 129, although other pins might be used to equal advantage. Said cam plate 132 is preferably so formed and placed that it causes the yarns to be gripped shortly after the hooks 127 and 131 have passed the center line of the machine in their rearward travel. By thus proportioning the parts, there will be assurance that the yarns will be properly engaged into said hooks before the latter clamp together.

In order to actuate the arm 124 from front to rear, and vice versa, I provide the same with a pin 133, which is adapted to engage a suitably formed cam. In the particular arrangement illustrated, this pin is carried by a finger 134 in the form of a bell crank arm, which is connected to the lower end of the arm 124. As a simple means for actuating both of the pins 112 and 133, I have provided suitably formed cam slots in the right and left faces of the plate 121. The cam slot 135 in the right face is the one which engages the pin 133 for oscillating the arm 124, while the cam slot 136 is the one which engages the pin 112 for raising and lowering the hook. The plate 121 carries a collar 137, which in turn is mounted on the shaft 122. Said shaft extends entirely through the machine from left to right, as is shown particularly in Figs. 5 and 7, and is journaled to the side walls of the machine. This shaft serves to actuate mechanism other than the knotter, but is herein made use of as a bearing on which to support the collar 137. A sleeve 138 is mounted on the shaft between the collar and the right hand end of the machine, said sleeve carrying a pinion 139, by which it may be rotated. This sleeve has a pair of lugs 140 which engage recesses 141 of the collar, so that the collar, including the plate 121, is forced to rotate strictly in accordance with the movements of the pinion 139. Means are provided for rotating said pinion in the proper direction at the proper instant, for the purpose of securing the desired actuation of the knotter. In the present case, use is made of the drum 21 for accomplishing this result. For this purpose a stub shaft 142 is extended through the right hand wall of the machine, the same carrying the gear 143 meshing with the pinion 139 and carrying the crank arm 144. This crank arm is connected by means of a link 145 with a lever arm 146, which is pivoted to the frame of the machine and carries a pin 147. This pin in turn engages a cam groove 148 formed in the right hand end of the drum, which groove is properly formed to secure the desired actuation of the knotter. Fig. 8 shows the right hand end of the drum in detail. In this figure the several cam grooves are shown in relation to the several levers in the positions which they occupy when the machine is in the normal position corresponding to the instant when one sock is completed and another one is commenced. At this instant the yarn carriers 102 for the ribbed top stand idle at the right hand end of the machine, having just been released by the disengaging of the hooks 81 and 82 from the notches in the plates 83 and 84 in the manner previously described. Under these circumstances, and for a short interval prior to the commencement of the knitting of the next sock, the ribbing yarns will remain stretched across the space immediately above the knotter. Therefore, it is desired to raise the hook 110 of the knotter for the purpose of grasping these yarns and drawing them down where they can be operated on by the knotter. To accomplish this result, the cam slot is provided with a short portion 149 of greater radius than the normal portion 150, so that as soon as the drum commences to rotate in the direction of the arrow of Fig. 8, the pin 147 will be raised momentarily. This will cause a lowering of the other end of the lever 146, which will lower the link 145 and thus cause the sleeve 138 to be rotated over in the direction of the arrow in Fig. 7. This will correspond to the rotation of the plate 121 in the direction of the arrow in Fig. 13. The plate 121 normally stands in such position that the pin 112 occupies approximately the position 151 of Fig. 13. Therefore, as soon as the plate is rotated by the engagement of the portion 149 of the cam slot 148 with the pin 147, the pin 112 will be raised by the portion 152 of the slot 136, thus simultaneously raising the hook 110 and causing it to engage the ribbing yarns. As soon as any further movement of the drum occurs, the pin 147 will be engaged by the portion 153 of the cam slot 148, which portion is of less radius than the normal. This will correspond to an oscillation of the disk 121 to the opposite extreme. Therefore, the hook 110 will be immediately lowered to its normal position, which it will continue to occupy. The present movement of the pin 147 will correspond to the movement of the plate 121 in the direction shown by the arrow of Fig. 12. It will be noted that on account of the increasing radius of the cam slot 135 the pin 133 will be driven out to thereby swing the arm 124 to the rear of the machine and thus cause the knot to be tightened and stripped from the bill. I desire, however, to point out the fact that when the arm 124 is swung to its extreme rearward position in the manner just described, the yarns will not again be released from the hooks 127 and 131 until a slight reverse movement has taken place. In this manner the yarns which have been grasped by said hooks will be securely held against free movement until the arm 124 is restored to its normal position by a change in the configuration of the cam slot 148 of the drum. This change takes place at some time prior to the commencement of the knitting of the ribbed top, so that when such knitting commences the ribbing yarns will be entirely free from the knotter.

From an examination of the above mechanism it will be seen that the ribbing yarns are tied together during the interval between the completion of one sock and the commencement of the ribbing operation of the next sock. It will soon be seen that the movements of the knotter mechanism are so timed that the ribbing yarns are at all times held against possible entanglement with other mechanism which are operated during the knitting of the body portion of the sock.

It has previously been shown that it is desirable to provide means for setting to one side the knot formed by tying together the two ribbing yarns; and that by so doing this knot will ultimately be located to one side of the line of interlooping and will, therefore, not lie at an objectionable point in the completed sock. In the present case I have provided mechanism for pulling on one or the other of the ribbing yarns after they have been tied together, in order to displace the knot the desired distance to one side of the center. The mechanism herein adopted for accomplishing this result is shown particularly in Fig. 3, and comprises an arm 154 pivoted at the point 155 to a stationary portion on the left hand side of the machine, and normally held in the raised position illustrated in Fig. 3, by means of a spring 156. This arm is provided with a cam plate 157 which is adapted to be engaged by a pin 158 on the drum shaft 159, as the latter rotates in the direction of the arrow in Fig. 3. A plate 160 is slidably mounted on the arm, being normally drawn toward the pivotal point thereof by a spring 161. The yarn passes through a hole 162 in the end of the arm, the plate 160 being provided with a finger 163 which is adapted to overlie said hole and thus pinch the yarn when the plate 160 is forced outwardly against the tension of its spring. A cam plate 164 is mounted stationary, and a pin 165 on the slidable plate 160 engages said cam so that as the arm 154 and the plate 160 are forced down by the engagement of the pin 158 with the cam 157, the plate will simultaneously be forced out along the arm to thus pinch the yarn at the point where the finger 163 overlies the hole 162. In this manner the yarn is gripped during the first slight downward movement of the arm 154, so that during the latter stages of said movement the yarn will be pulled and thus the knot will be offset the desired distance to locate it on one side of the center of the machine. The pin 158 is so positioned on the drum shaft that this offsetting takes place after the knot is formed, and is completed prior to the commencement of the ribbing operation.

The machine herein illustrated is provided with mechanism for exerting a pull on the sock during the ribbing operation so as to improve the quality of the product. As the knitting progresses from course to course, the portion of the sock previously completed depends from the needles which are in operation at the particular instant considered. When the sock becomes of sufficient length, its lower portion will depend into a chute 166 or the like, the opening of which is shown in Fig. 1. At the lower end of this chute there is mounted a pair of co-acting serrated or corrugated rollers. One of these is carried by the shaft 167 which is journaled in stationary journals of the frame of the machine. The other roller, 168, however, is journaled in a yoke or frame which, in turn, is pivoted to the frame of the machine so that said roller can be swung toward or pulled away from the roller on the shaft 167. In the particular arrangement illustrated, this yoke comprises side arms 169 and 170, which are connected together in their upper portion by a crosspiece 171, so that they are rigid with respect to each other and swing as a unit. The lower end of the arm 169 connects to a member which is pivoted at the point 172 to the left hand end of the machine, and the lower end of the arm 170 is connected to a member which is pivoted at the point 173 to the right hand end of the machine. Springs 174 and 175 are connected to members 176 and 177 on the left and right hand ends of the yoke respectively, said springs tending to pull the yoke in toward the machine for the purpose of carrying the roller 168 into co-active relationship with respect to the roller on the shaft 167. Wing nuts 178 or the like are provided for regulating the amount of tension on the springs. With the arrangement thus far described, the springs would always tend to hold the rollers together. There are provided means for swinging the yoke back into inoperative position as soon as the ribbing operation is completed, and for holding it in such inoperative position until the time arrives for pulling on another sock. The arrangement illustrated comprises an arm 179 connected to the lower end of the yoke and having a pin 180 working in a slot 181 in the left hand side of the machine, and engaging a cam surface 182 of the left hand end of the drum. This cam surface has the cut-away portion 183 best shown in Fig. 9, so that when the proper time arrives the pin 180 will be allowed to swing down and the yoke will be pulled in under the influence of the springs and held in such position until the pin rises up on the opposite end of the cut-away portion of the cam surface to again swing the yoke outward and withdraw the roller 168 from the roller on the shaft 167.

There are provided means for positively rotating the rollers for the purpose of pulling on the sock, and more particularly, means for causing such rotation to take place only during the interval while a sock is being pulled upon. In order to insure the best operation, this rotation of the rollers should be of an intermittent nature—that is, by a series of impulses. In the particular embodiment illustrated, there is provided a cam 184 on the main shaft 24, which cam rotates constantly during the rotation of such shaft. An arm 185 is pivoted to a stationary element 186, said arm having a boss 187 in position to engage the lug 188 of the cam whenever the arm is pressed up high enough to bring its boss into engagement with the cam. This arm connects by a link 189 with an arm 190, which is pivoted at the point 191 to a stationary portion of the machine. The boss 192 is provided on the arm 190, said boss being in position to be engaged by a downwardly extending finger 193 connected to the yoke. When the yoke is swung out after a sock has been completed, the lower end of said finger will swing in and will ride up on the cam surface 194 of the boss 192, thus depressing the arm 190, and thereby the arm 185, such a distance as to carry the boss 187 of said last mentioned arm down so low that it will not be struck by the lug 188 of the cam 184 as the latter rotates with the main shaft. A spring 195 acts on the arm 190 to raise the same whenever the finger 193 is swung away from the boss 192, so that as soon as the roller 168 is swung in toward the roller on the shaft 167 the spring 195 will raise the arm 190, and likewise the arm 185, until the boss 187 of said last mentioned arm engages the cam 184. Thereupon said arm will be oscillated up and down with each rotation of the cam and main shaft, and the arm 190 will likewise be oscillated. Said oscillating arm and associated parts are for the purpose of rotating the rollers by a series of steps or impulses. For this purpose a link 196 has its lower end connected to the link 189 and its upper end connected to a short lever arm 197. The other end of said lever arm carries a dog 198 which is adapted to engage the teeth of the roller 168 for the purpose of feeding the same. A detent 199 serves to prevent a retroactive movement of said roller as it is fed. A dog 200 is carried by the arm 190 and engages a toothed wheel 201, the retroactive movement of which is prevented by a dog 202. This toothed wheel is mounted on a shaft 203, which extends through the machine from one side to the other, its left hand end carrying a sprocket wheel 204 which drives a chain 205. The latter in turn drives a sprocket 206 on the shaft 167 which carries the other roller.

From the above it will be seen that as soon as the yoke is swung inward to bring the roller 168 into coactive relationship with the roller on the shaft 167, the feeding mechanism will be brought into action and both of the rollers will be rotated in the proper directions for pulling on the sock, the end of which is depending between them. In order to adjust the parts, I have mounted the finger 193 on the yoke in such a way that it can be adjusted up or down so that the feeding mechanism will be brought into play at the proper time. This construction is well illustrated in Fig. 2.

Adjacent to the right hand end needle there is mounted a knife and clamping device for cutting off and holding the free end of the body yarn prior to the commencement of the ribbing operation. This device is shown mounted in operative position in Figs. 5, 6 and 7 and in detail in Figs. 15 and 16. For the sake of convenience it is herein shown as mounted on the left face of the knotter, although it will be understood that any other convenient system of mounting it might be adopted. As shown particularly in Fig. 15 an L-shaped plate 208 is mounted with its longer leg standing vertically adjacent the knotter, its shorter leg 209 being rigidly secured to the knotter as by means of screws 210. Plates or blocks are interposed between said shorter leg and the face of the knotter for the purpose of sustaining the L-shaped plate a suitable distance from the knotter. The forward edge 211 of the L-shaped plate is sharpened and acts as one of the cutting edges of a shear. The other cutting edge is the upper edge of a bar 212 which is pivoted at the point 213, so that it can be rocked forward and back to perform the cutting and clamping operations. Between the upstanding leg of the L-shaped plate and the knotter there is mounted a spring plate 214, the same being held such a distance from the L-shaped plate that as the arm 212 is rocked it is forced between the upstanding leg and the spring plate 214, and firmly contacts against both of them. The right hand edge of the upper portion of the bar 212 and the left hand edge of the upper portion of the spring plate are both rounded or beveled to such an extent that when the bar 212 is rocked the yarn will not be cut between said edges, but will be clamped between them and securely held. A guide finger 215 is secured to the right hand face of the bar 212 but is so formed as to work against the right hand face of the spring plate. The forward end of this guide finger is provided with hook 216 so as to insure that when the bar 212 has its upper end rocked back the yarn will also be carried back and securely clamped, as above described. This finger 215 stands slightly above the guide notch 115 which is mounted immediately adjacent the hook 110.

From an examination of Fig. 5 it will be seen that when the main yarn carrier completes its last stroke to the right and is disconnected so that it stands in such position it will hold the body yarn stretched across the guide finger 215, provided the arm 212 has its upper end swung forward, and, therefore, said body yarn will be held in position to be acted upon by the knife and clamping edges when the upper end of the bar 212 is rocked back. When this happens the body yarn will be severed at a point between the completed portion of the sock and the main yarn carrier, but the end of the yarn extending from the main yarn carrier will be securely clamped and held until the upper end of the bar 212 be again rocked forward. Thus it happens that the completed body portion of the sock may be severed from the yarn coming from the yarn carrier, but said yarn will be firmly clamped and held.

For the purpose of rocking the bar 212 when the time arrives I have provided the shaft 122 which has been previously mentioned. The same extends across the machine from side to side being journaled in the side walls as shown in Fig. 7 and carrying the crank 217. The latter has a pin 218 which engages with a slot 219 in the lower end of bar 212 so that by simply rotating the shaft the upper end of said bar will be rocked either forward or back. A crank 220 is secured to the shaft at a point outside of the left side wall, said crank being connected by a link 221 to the forward end of a lever 222, which is pivoted at the point 223 to a stationary element. The rear end of the said lever as the pin 224 riding in a cam slot 225 of the left hand end of the drum as shown particularly in Figs. 3 and 9. At the point 226 the radius of this cam increases so that as the drum rotates in the direction of the arrow of Fig. 9 when said point of increased radius strikes the pin 224 the latter will be thrown up, thus raising the rear end of the lever 222 and simultaneously depressing its right end. This will lower the link 221 and will result in a rotation of the shaft 122 in the direction of the arrows shown in Fig. 7. Rotation of the shaft in said direction in turn will cause the upper end of the bar 212 to rock forward. A contrary action will take place when the point 227 of the cam slot strikes the pin 224. By properly shaping the cam slot the movements of the bar 212 can be timed according to the particular requirements of the machine.

It was previously stated that the upper end of the bar 212 is rocked to the rear while the main yarn carrier stands at the right hand side of the machine so as to cut off the body yarn and clamp the free end of the same. It will be seen that when these operations have taken place the said body yarn will remain stretched over the finger 126 of the arm 124 of the knotter. However, in the construction illustrated, on account of the rearward rocking of the hook 216 of the guide finger 215, it will be found that the body yarn when thus stretched lies too far to the rear to be caught by the hook 110 when the same rises, and consequently, the body yarn will not be tied in with the ribbing yarns. Of course, the parts might be so proportioned that such tying in would take place. The body yarn will, however, lie across the finger 126 and will, therefore, be caught and held by the plate 128 when the arm 124 swings to the rear, as previously described.

For purposes of convenience, in illustration I have shown the present machine as equipped with a trip device, whereby the machine will be stopped in case of breakage of any one of the yarns. It is not considered necessary to go into the details of the construction of this device as the same is well known and understood in the art.

Obviously the exact instants at which the several mechanisms will be actuated will depend very largely upon the shapes of the cam slots of the controlling drum. In Figs. 8 and 9 these cam slots are shown as of configurations suitable for actuating the several parts in a desired manner for producing a given product. Furthermore, in these figures the ends of the drum are illustrated in approximately the position which they occupy with respect to the several levers at the instant when one sock is being completed and another one commenced. Following out the sequence of operations it will be found that upon the completion of the ribbing operation for one sock, the knotter hook 110 will be projected by the engagement of the portion 149 of the cam slot 148 with the pin 147, and that immediately afterward the knotter will be reversed, thereby swinging the arm 124 and finger 126 rearwardly at which time the knot will be tied and tightened by the rearwardly swinging of said arm and finger. The actuation of the tying bill will also sever the ribbing yarns so as to cut the completed sock free from the knotter. Some time during the knitting of the next succeeding sock, or prior to the commencement of the ribbing operation on the same, the point 229 of the cam slot 148 will strike the pin 147 to again raise the same to its normal position, thus swinging the arm 124 forward and releasing the ribbing yarns which were previously tied together, but held by the hook 127 of said arm. The body yarn was also held by said hook, and consequently this yarn will also be released when the above mentioned movement takes place. Some time after the above movement occurs the point 226 of the cam slot 225 will engage the pin 224 to raise the rear end of the lever 222 whereby rotating the shaft 122 over in the direction of the arrow in Fig. 7 to thereby release the end of the body yarn which was held between the upper end of the bar 212 and the spring bar 214. When this takes place the body yarn will be completely freed from both the knotter and the clamping mechanism mounted adjacent its left hand face. Prior to picking up the ribbing yarn carriers and bringing the ribbing needles into operation, the transferring operation takes place. During this operation the last course of loops of the body portion is transferred from the needles 62 to the needles 71. During this transferring operation the main yarn carrier stands at the right hand side of the machine, having been previously released from the link 36. This being the case the body yarn remains stretched across the guide fingers 215 and 126. When the point 227 of the cam slot 225 engages the pin 224 the rear end of the lever 222 will be lowered to reverse the movement of the shaft 122 and cause the upper edge of bar 212 to swing rearwardly, thereby severing the body yarn but clamping the free end thereof in the manner previously described. Thus it happens that when arm 124 is next thrown to the rear the body yarn will be grasped by the hook 127 along with the ribbing yarn.

In Fig. 17, I have shown in greatly enlarged detail those portions of a sock of which the construction is chiefly affected by the attachments or improvements of the present invention. In this figure, only a small portion of the circumference of the sock is represented, and only that portion immediately adjacent the knot which ties together the two ends of the ribbing yarns. The shaded yarn 228 is the body yarn, while the white and black yarns 229 and 230 respectively are the two yarns of the ribbed top. The stitch for the body portion travels in circular courses entirely around the sock. These courses are represented as traveling from left to right as each one is formed. When the upper end of the bar 212 is thrown to the rear, the body yarn is severed to form the end 231, the top row of loops at such time being sustained on the needles 62 until the transferring operation takes place. The knot 232 is the one which joins together the beginning ends of the ribbing yarns. The vertically extending rib 233 is one of the lines of interlooping between the ribbing yarns as they travel back and forth in their successive courses. In the sock illustrated in Fig. 17, the knot 232 has been offset from the line of interlooping 233, so that it does not fall immediately adjacent the lower end of said line of interlooping. When the ribbing operation commences, the ribbing needles and yarn carriers are so actuated that the successive loops and courses travel in the directions indicated by the arrows, back and forth on the two sides of the sock, the two yarns being interlooped on the line 233 and on a similar line at a point diametrically opposite from that illustrated in the figure. Of course, the black yarn 230 between the knot 232 and the point of commencement 234, really constitutes a portion of the left hand yard, but for the sake of convenience it is blackened so as to emphasize the fact that the knot has been offset from the center. In case the offsetting operation had not been performed the knot would have been located at the point 234 instead of at the point illustrated.

I wish to emphasize the fact that I do not limit my invention to the combination of a knotter with the form of knitting machine herein illustrated and described, but that I intend rather to cover broadly the combination of a knotter with a knitting machine in which a portion of the product or the entire product is knit from two yarns, so that said knotter will perform the function of joining together said yarns before they are knit together. I also wish to emphasize the fact that at times an offsetting mechanism may be dispensed with, as, for example, in those cases in which it is not objectionable to have the knot on the line of interlooping, or in those cases in which the knotter is so placed that the knot is originally formed off center so that it would be unnecessary to offset it.

I claim:

1. In a knitting machine adapted to the formation of a product having a ribbed portion and formed from two ribbing yarns commencing at a common point, the combination of sets of ribbing needles, yarn carriers for the two yarns of the ribbed portion, means for actuating the ribbing needles, means for actuating the ribbing yarn carriers, and means for joining together the ribbing yarns prior to the commencement of a ribbing operation, substantially as described.

2. In a knitting machine adapted to the formation of a knit product knit from two yarns and having a knitting operation wherein both of said yarns are used commencing at a common point, the combination of mechanism for knitting such product from two yarns, and mechanism for joining together the two yarns prior to the commencement of the knitting operation in which said yarns are used, substantially as described.

3. The combination with mechanism adapted to the formation of a knit product knit from two yarns and having a knitting operation wherein both of said yarns are used commencing at a common point, of means for tying together said yarns prior to the commencement of the knitting operation in which said yarns are used, substantially as described.

4. In a knitting machine adapted to the formation of a product having a portion knit from two yarns, which yarns are interlooped on a line of interlooping, the combination of mechanism for tying together said yarns prior to the commencement of the knitting operation in which said yarns are used, and mechanism for displacing to one side the knot produced in the tying operation, whereby said knot is offset from the aforementioned line of interlooping, substantially as described.

5. In a knitting machine adapted to the formation of a product having a ribbed portion knit from two yarns, in which product said yarns are looped together on a line of interlooping, the combination of means for tying together said yarns prior to the commencement of the ribbing operation, and means for offsetting to one side the knot produced in said tying operation, whereby the knot in the completed product is offset from the line of interlooping, substantially as described.

6. In a knitting machine adapted to the formation of ribbed top socks or stockings, in which ribbed top two ribbing yarns are used commencing at a common point, the combination of means for tying together said ribbing yarns prior to the commencement of the ribbing operation, and means for subsequently knitting the ribbed top from said yarns, substantially as described.

7. In a knitting machine adapted to the formation of ribbed top socks or stockings from two yarns, the combination of means for knitting said ribbed top from said yarns, and means for severing said yarns after the completion of the ribbing operation for one sock, and for joining together said yarns prior to the commencement of the ribbing operation of another sock, whereby when the ribbing operation of the second sock is commenced the ribbing yarns thereof are joined together, substantially as described.

8. In a knitting machine adapted to the formation of ribbed top socks or stockings in which the ribbed portion is formed from two yarns, the combination of means for knitting said ribbed portion from said yarns, and a knotter adapted to sever the ribbing yarns from a completed sock and to tie them together prior to the commencement of the ribbing operation for the next succeeding sock, substantially as described.

9. The combination with a knitting machine having sets of ribbing needles and yarn carriers therefor and adapted to the formation of a sock or stocking having a ribbed top, of means for severing the ribbing yarns from a completed ribbed top and for joining together said yarns prior to the commencement of the ribbing operation for the next succeeding sock, substantially as described.

10. In a knitting machine adapted to the formation of a product having a ribbed portion formed from two separate yarns, the combination of oppositely disposed sets of ribbing needles mounted in rows, ribbing yarn carriers adapted to travel back and forth adjacent said needles for supplying ribbing yarn to them, means for actuating the ribbing needles, means for actuating the ribbing yarn carriers, a knotter located adjacent the end needles, and beneath the line of travel of the ribbing yarn carriers, means for drawing the ribbing yarns into position to be acted upon by the knotter, and means for actuating the knotter to tie together the ribbing yarns when thus drawn into position to be acted upon, substantially as described.

11. In a knitting machine adapted to the formation of a product having a ribbed portion formed from two yarns, the combination of oppositely disposed rows of ribbing needles, ribbing yarn carriers adapted to travel back and forth adjacent said needles for the purpose of supplying ribbing yarn to them, a knotter mounted adjacent the end ribbing needles, and beneath the line of travel of the yarn carriers, means for grasping the ribbing yarns and drawing them into position to be acted upon by the knotter when the ribbing yarn carriers are at an extreme position in their line of travel, and means for actuating the knotter to tie together the ribbing yarns when thus brought into position to be acted upon, substantially as described.

12. In a knitting machine the combination of rows of ribbing needles, ribbing yarn carriers adapted to travel back and forth adjacent said needles, a knotter mounted adjacent the end needles and beneath the line of travel of the ribbing yarn carriers, a hook adapted to be projected into position to grasp the ribbing yarns when the ribbing yarn carriers are at an extreme position in their line of travel, means for projecting said hook for the purpose of grasping the ribbing yarns and drawing them into position to be acted upon by the knotter, and means for subsequently actuating the knotter to tie together said ribbing yarns, substantially as described.

13. In a knitting machine having sets of ribbing needles and ribbing yarn carriers adapted to supply ribbing yarns to said needles and having a rotatable element adapted to control the operation of the ribbing needles, the combination of a knotter mounted in position to tie together the ribbing yarns prior to the commencement of the ribbing operation, and an operative connection from said rotatable element to said knotter for the purpose of actuating the knotter to tie the knot, substantially as described.

14. In a knitting machine the combination of ribbing needles, ribbing yarn carriers adapted to travel back and forth adjacent said needles, a rotatable element adapted to control the set up of the ribbing needles, a knotter mounted in position to tie together the ribbing yarns prior to the commencement of the ribbing operation, and an operative connection from said rotatable element † said knotter for the purpose of actuating ᴜᴇ knotter to tie the knot, substantially as described.

15. In a knitting machine having sets of ribbing needles and ribbing yarn carriers adapted to supply ribbing yarns to said needles and having a rotatable element adapted to control the operation of the ribbing needles, the combination of a knotter mounted in position to tie together the ribbing yarns prior to the commencement of the ribbing operation, there being a cam slot in the rotatable element, and an operative connection from said cam slot to said knotter for the purpose of actuating the knotter to tie the knot, substantially as described.

16. In a knitting machine having sets of ribbing needles and ribbing yarn carriers adapted to supply ribbing yarns to said needles and having a rotatable element adapted to control the operation of the ribbing needles, the combination of a knotter mounted in position to tie together the ribbing yarns prior to the commencement of the ribbing operation, mechanism for grasping the ribbing yarns and drawing them into position to be acted upon by the knotter, and an operative connection from the rotatable element to the knotter and to said grasping mechanism for the purpose of first grasping the ribbing yarns and bringing them into position to be acted upon, and then for actuating the knotter to tie the knot, substantially as described.

17. In a knitting machine the combination of rows of ribbing needles, ribbing yarn carriers adapted to travel back and forth adjacent said needles, a knotter mounted adjacent the end needles and out of the line of travel of the ribbing yarn carriers, mechanism adapted to be projected into position to grasp the ribbing yarns when the ribbing yarn carriers are at an extreme position in their line of travel, means for projecting said mechanism for the purpose of grasping the ribbing yarns and drawing them into position to be acted upon by the knotter, and means for subsequently actuating the knotter to tie together said ribbing yarns, substantially as described.

18. In a knitting machine the combination of rows of ribbing needles, ribbing yarn carriers adapted to travel back and forth adjacent said needles, a rotatable element adapted to control the operation of the ribbing needles, a knotter mounted adjacent the end needles and out of the line of travel of the ribbing yarn carriers, mechanism adapted to be projected into position to grasp the ribbing yarns when the ribbing yarn carriers are at an extreme position in their line of travel, and an operative connection from the said rotatable element to said projecting mechanism and the knotter for the purpose of first projecting said mechanism to grasp the ribbing yarns and draw them into position to be acted upon by the knotter, and for subsequently actuating the knotter to tie together the ribbing yarns, substantially as described.

19. In a knitting machine the combination of rows of ribbing needles, ribbing yarn carriers adapted to travel back and forth adjacent said needles, a knotter mounted adjacent the end needles and out of the line of travel of the ribbing yarn carriers, a rotatable element adapted to control the operation of the ribbing needles, mechanism adapted to be projected into position to grasp the ribbing yarns when the ribbing yarn carriers are at an extreme position in their line of travel, there being a cam slot in said rotatable element, and an operative connection from said cam slot to said projecting mechanism and the knotter for the purpose of projecting said mechanism to grasp the ribbing yarns and draw them into position to be acted upon by the knotter, and for subsequently actuating the knotter to tie together the ribbing yarns, substantially as described.

20. In a knitting machine the combination of rows of ribbing needles, ribbing yarn carriers adapted to travel back and forth adjacent said needles, a knotter mounted adjacent the end needles and out of the line of travel of the ribbing yarn carriers, mechanism adapted to be projected into position to grasp the ribbing yarns when the ribbing yarn carriers are at an extreme position in their line of travel, mechanism for offsetting the yarn after the knot has been tied, a rotatable element adapted to control the operation of the ribbing needles, an operative connection from said rotatable element to said offsetting mechanism, and an operative connection from said rotatable element to the knotter and projecting mechanism, substantially as described.

21. In a knitting machine the combination of a set of body needles, sets of ribbing needles, yarn carriers for all of said needles, a knife mounted adjacent the end needles and adapted to sever the body yarn, a knotter mounted adjacent the said knife, mechanism adapted to be projected into position for grasping the ribbing yarns to draw them into position to be acted upon by the knotter, a rotatable element, an operative connection from the rotatable element to the knife for the purpose of severing the body yarn, and an operative connection from the rotatable element to the knotter for the purpose of tying the ribbing yarns together, substantially as described.

22. In a knitting machine the combination of a set of body needles, a set of ribbing needles, yarn carriers for all of said needles, a knife and clamping mechanism mounted adjacent the end needles for the purpose of severing the body yarn and clamping the free end thereof, a knotter mounted adjacent the knife and clamping mechanism, a rotatable element adapted to control the set up of the needles, an operative connection from said rotatable element to the knife for first causing the same to sever the body yarn and clamp the free end thereof, and an operative connection from the rotatable element to the knotter for the purpose of tying together the ribbing yarns, substantially as described.

23. In a knitting machine the combination of a set of body needles, a set of ribbing needles, yarn carriers for all of said needles, a rotatable element for controlling the set up of said needles, a knife and clamping mechanism mounted adjacent to the end needles for the purpose of severing the body yarn and clamping the free end thereof, a knotter mounted adjacent the knife and clamping mechanism and out of the line of travel of the yarn carriers, mechanism adapted to be projected for the purpose of grasping the ribbing yarns to draw them into position to be acted upon by the knotter, mechanism for grasping the ribbing yarns for the purpose of tightening the knot, an operative connection from the rotatable element to the knife and clamping mechanism for the purpose of severing the body yarn and clamping the free end thereof, and an operative connection from the rotatable element to the knotter, projecting mechanism, and tightening mechanism, for the purpose of actuating the projecting mechanism to grasp the ribbing yarns and draw them into position to be acted upon by the knotter, and for the purpose of actuating the tightening mechanism for the purpose of grasping all of the yarns and drawing them to one side to tighten the knot, substantially as described.

JOHN F. NELSON.

Witnesses:
 FRITHIOF NELSON,
 AMY DENMAN.